US011210735B2

(12) United States Patent
Lejdstrom et al.

(10) Patent No.: US 11,210,735 B2
(45) Date of Patent: Dec. 28, 2021

(54) DATA PROCESSING METHOD, SYSTEM, AND NON-TRANSITORY COMPUTER-READABLE MEDIUM

(71) Applicant: Nasdaq Technology AB, Stockholm (SE)

(72) Inventors: Bengt Lejdstrom, Sollentuna (SE); Oskar Sander, Stockholm (SE); Johan Soderqvist, Nacka (SE)

(73) Assignee: Nasdaq Technology AB, Stockholm (SE)

( * ) Notice: Subject to any disclaimer, the term of this patent is extended or adjusted under 35 U.S.C. 154(b) by 162 days.

(21) Appl. No.: 16/395,382

(22) Filed: Apr. 26, 2019

(65) Prior Publication Data
US 2019/0251635 A1 Aug. 15, 2019

Related U.S. Application Data

(63) Continuation of application No. 11/724,313, filed on Mar. 15, 2007, now abandoned.

(60) Provisional application No. 60/789,574, filed on Apr. 6, 2006.

(51) Int. Cl.
*G06Q 40/04* (2012.01)
(52) U.S. Cl.
CPC ..................... *G06Q 40/04* (2013.01)
(58) Field of Classification Search
CPC ....................................... G06Q 40/04
USPC ........................................... 705/37
See application file for complete search history.

(56) References Cited

U.S. PATENT DOCUMENTS

| | | |
|---|---|---|
| 5,978,780 A | 11/1999 | Watson |
| 6,076,074 A | 6/2000 | Cotton et al. |
| 6,247,000 B1 | 6/2001 | Hawkins et al. |
| 7,225,153 B2 | 5/2007 | Lange |
| 7,376,622 B1 | 5/2008 | Padalino et al. |
| 7,523,054 B2 | 4/2009 | Tyson-Quah |
| 7,536,354 B1 | 5/2009 | deGroeve et al. |
| 7,660,762 B1 | 2/2010 | Mellina |
| 7,848,997 B2 | 12/2010 | Lejdstrom et al. |
| 8,543,478 B2 * | 9/2013 | Leistner .............. G06Q 20/102 705/36 R |
| 8,577,778 B2 * | 11/2013 | Lange ............... H01L 21/28061 705/37 |
| 8,589,282 B1 * | 11/2013 | Jackson ............. G06Q 10/0639 705/38 |
| 2001/0049649 A1 | 12/2001 | Baecker et al. |
| 2002/0032642 A1 | 3/2002 | Chichilnisky |
| 2002/0087454 A1 | 7/2002 | Calo et al. |
| 2002/0099641 A1 | 7/2002 | Mills et al. |
| 2002/0133455 A1 | 9/2002 | Howorka et al. |
| 2002/0188552 A1 | 12/2002 | Kavounas et al. |
| 2002/0188560 A1 | 12/2002 | Kawashima et al. |
| 2003/0225681 A1 | 12/2003 | Cummings et al. |
| 2004/0128222 A1 | 7/2004 | Turbeville et al. |
| 2004/0128223 A1 | 7/2004 | Kuhn et al. |

(Continued)

FOREIGN PATENT DOCUMENTS

EP 1396803 3/2004

OTHER PUBLICATIONS

European Central Bank Occaisional Series Paper 076 (Year: 2007).*

(Continued)

*Primary Examiner* — Bruce I Ebersman
(74) *Attorney, Agent, or Firm* — Nixon & Vanderhye P.C.

(57) ABSTRACT

Example embodiments of a data processing method, system, and non-transitory computer-readable medium are described.

19 Claims, 8 Drawing Sheets

(56) References Cited

U.S. PATENT DOCUMENTS

| | | | |
|---|---|---|---|
| 2004/0148252 A1 | 7/2004 | Fleishman | |
| 2004/0153403 A1 | 8/2004 | Sadre | |
| 2005/0010613 A1 | 1/2005 | Lejdstrom et al. | |
| 2005/0086165 A1 | 4/2005 | Pawelczyk et al. | |
| 2005/0203836 A1 | 9/2005 | Woodward et al. | |
| 2005/0222938 A1 | 10/2005 | Treacy et al. | |
| 2005/0246251 A1 | 11/2005 | Feldhoffer et al. | |
| 2006/0074793 A1 | 4/2006 | Hibbert et al. | |
| 2006/0095361 A1 | 5/2006 | Rude | |
| 2006/0167784 A1 | 7/2006 | Hoffberg | |
| 2006/0224494 A1* | 10/2006 | Pinkava | G06Q 40/04 705/37 |
| 2007/0078736 A1 | 4/2007 | Chand et al. | |
| 2007/0118459 A1 | 5/2007 | Bauerschmidt et al. | |
| 2007/0118460 A1* | 5/2007 | Bauerschmidt | G06Q 40/06 705/37 |
| 2007/0136180 A1 | 6/2007 | Salomon et al. | |
| 2008/0027774 A1* | 1/2008 | Jameson | G06Q 10/06393 705/7.28 |
| 2008/0071664 A1 | 3/2008 | Silverman et al. | |
| 2008/0270278 A1 | 10/2008 | Cummings et al. | |

OTHER PUBLICATIONS

U.S. Appl. No. 11/724,313, filed Mar. 15, 2007, Lejdstrom et al.
PTAB Decision on Appeal issued Feb. 27, 2009 in U.S. Appl. No. 11/724,313, 20 pages.
Examiner's Answer dated Nov. 28, 2016 in U.S. Appl. No. 11/724,313, 23 pages.
Final Office Action dated Mar. 18, 2016 in U.S. Appl. No. 11/724,313, 15 pages.
Office Action dated Sep. 15, 2015 in U.S. Appl. No. 11/724,313, 16 pages.
Final Office Action dated Aug. 13, 2013 in U.S. Appl. No. 11/724,313, 31 pages.
Office Action dated Feb. 6, 2013 in U.S. Appl. No. 11/724,313, 14 pages.
Final Office Action dated Apr. 26, 2010 in U.S. Appl. No. 11/724,313, 20 pages.
Office Action dated Oct. 28, 2009, in U.S. Appl. No. 11/724,313, 16 pages.
Office Action dated Feb. 17, 2009, in U.S. Appl. No. 11/724,313, 12 pages.
Declaration of Non-Establishment of International Search Report dated Jul. 3, 2007 in PCT/EP2007/053303 (2 pages).
Austrian Search Report and Written Opinion, dated Aug. 5, 2009 in corresponding Singapore Application No. 200718776-8, 7 pages.
Search Report, Written Opinion for SG 200807168 dated Mar. 5, 2009, 10 pages.
Declaration of Non-Establishment of International Search Report dated Jun. 27, 2007 in corresponding PCT Application No. PCT/EP2007/053307, 2 pages.

* cited by examiner

DATA PROCESSING METHOD, SYSTEM, AND NON-TRANSITORY COMPUTER-READABLE MEDIUM

CROSS-REFERENCE

This application is a continuation of U.S. patent application Ser. No. 11/724,313, filed Mar. 15, 2007, claiming priority to U.S. Provisional Application No. 60/789,574 filed Apr. 6, 2006, the entire contents of which are hereby incorporated by reference in this application.

BACKGROUND

Globalization has directly impacted various aspects of the Central Securities Depository (CSD) market sector. A drive for consistency and a more standardized approach in operations and systems has resulted. In addition, there is continuous pressure on participants and operators to improve efficiency in all elements of the transaction value chain. CSDs are exposed to more complicated securities and resultant activities, e.g. Corporate Actions, because of the global perspective and market refinement. Processes and systems must now be much more adaptable. In such a dynamic environment "speed to market" of new products and services is critical. The CSD systems must facilitate this "speed", which can be achieved by flexible, generic functionality for the different steps in the settlement or other processes.

Transactions between market participants require matching and settlement. Trades can be captured directly from a trading (exchange) system or other external system, such as a Central Counterparty (CCP), matching service or back office system or manually entered by participants. Trade matching and confirmation prepare transactions for settlement according to applicable settlement rules. Assets and financing are verified, and securities may be locked-in in the investor CSD prior to settlement.

SUMMARY

An overall object and purpose of the securities settlement system (SSS) is to increase the flow of successful trades, by minimizing the demands for liquidity of cash especially.

A securities settlement system that achieves the object and purpose is obtained through a securities settlement system comprising an input for receiving trade information, a selector for selecting a group of trades to be cleared, an aggregation unit for determining an aggregated obligation to be cleared by each user associated with the group of trades and a settlement unit for executing the aggregated obligations for each user to clear the trades in the group of trades.

Grouping trades and aggregating the obligation to be cleared for each user increases usability and speed of the clearing. Each user's account is accessed a minimum of times (essentially once) and a minimum of transfers of securities is also established. Aggregating also provides the benefit of enabling clearing of a series of trades where a traditional one by one clearing would have resulted in trade removals or freezing the clearing. This is because in a group of trades a single user may have several trades that together are clearable as they net out.

An advantageous improvement is achieved in that the system further comprises a register indicating each user's obligation limit and a comparator for comparing each user's aggregated obligation with the obligation limit and if an obligation fails for a user, the selector modifies the selected group of trades to arrive at a new selected group of trades where all obligations can be met by all users.

Hereby it is guaranteed that all trades in the selected group of trades can be cleared. The re-selection process can be performed in many ways, for instance by iterating through a set of algorithms in order to determine a minimum of trades to be removed from the group in order to obtain a group in which all trades are clearable.

An alternative solution is obtained by a securities settlement system comprising an input for receiving trade information, a sorting unit for sorting out trades associated with a specific sorting criteria and an aggregation unit for determining an aggregated obligation to be cleared by each user.

The sorting criteria may be one or more specific users (prioritized users due to number of trades or amount of trades), one or more specific instrument types and one or more markets. A combination of these criteria or other trade specific criteria are also feasible.

A method that achieves an effective and improved settlement clearing is obtained by the method steps of receiving information relating to a number of trades; selecting a group of trades from said number of trades; determining an aggregated obligation to be cleared for each user associated with the group of trades; and executing the aggregated obligation for each user, thereby clearing the group of trades.

The new type of clearing combines multiple trades into one group and nets the effects of multiple debits and credits against the same account or cash record.

For example, consider two trades; one which debits the cash record A with $10 and the other that credits A with $10. By combining the two, the net effect is to do nothing against A. Therefore, even if A has no balance, the debiting trade can be completed.

Therefore, this system affects the areas around clearing and settlement. In summary, the following sections of the SSS are affected:
Clearing of obligations.
Handling of queue.
Settlement of instructions.

DETAILED DESCRIPTION

The basis for all clearing in the settlement system is the settlement obligation, which contains one or several debit or credit instructions. In the following, we assume each settlement obligation contains one such instruction.

A trade is converted into a set of obligations, called a settlement obligation group. Hence, a group is a list of debit and credit obligations that must be settled automatically and simultaneously. Thereby, a list of entered trades give rise to a list of settlement obligation groups.

Clearing a group thus means to reserve the necessary amounts induced by the contained debit obligations, before these can be settled together with the corresponding credit obligations.

For each such list of groups, the settlement system is required to clear and settle as many as possible whenever it is invoked. The normal mode is to invoke the system repeatedly and settle the groups reactively in real-time. However, it may also be that the system is invoked periodically, thus confronted with large sets of groups that, of course, could be settled one by one, but where there are several opportunities to do "better" than that.

Figure 1:
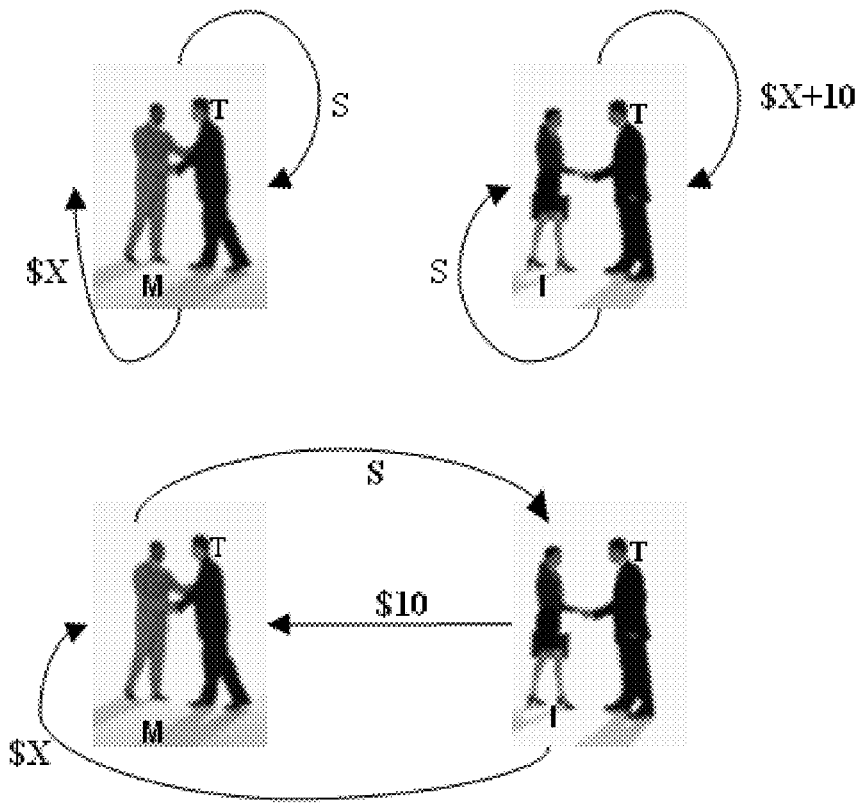
FIG. 1 illustrates how aggregation of trades reduces the number of necessary transactions.

For example, consider the scenario of FIG. 1. Assume the participant T is a great trader. He buys a security S for \$X from a market-maker M, and sells it for \$X+10 to investor I. But assumes he has no money. Hence, he cannot buy S, nor complete the sell. But, if the system aggregated the two trades, it could deliver S to I from M, and \$10 to T from I, and \$X to M from T.

Such deadlock situations occur frequently in a market, and require special attention from the settlement system to improve the completion rate of trades (as this is the true purpose of any market). In the general case, the deadlock may occur via a chain of trades between multiple participants.

The requirement then is to make the settlement system aggregate trades to minimize the demand for liquidity by resolving deadlocks.

In the following we look into the details of the clearing and settlement process, to better illustrate the changes made in the settlement system and process.

Settlement Definitions

We use the following definitions from here on. Rather than referring to netted we prefer the term aggregated, since netting is a term somewhat misused.

(Settlement) obligation, i.e. a tuple of four values: (A,I,V,P), where A refers to an account or cash record, I to a security or currency, V to a volume or amount (negative or positive), and P to a priority (Active, Deferred).

(Settlement obligation) group, i.e. a list of obligations, where it is assumed that for any two obligations (A,I,V,P) and (B,J,W,Q) in a group, either A< >B or I< >J (otherwise, they are aggregated into one). A two-party trade is typically represented by a group of four obligations (one debit/credit per participant and counterpart).

Obligation aggregation, i.e. two obligations (A,I,V,P) and (A,I,W,Q) are aggregated by replacing them with (A,I,V+W,Pm), where Pm is the minimum priority of P and Q.

Group graph, i.e. an undirected graph of groups constructed as follows. Two groups G1 and G2 are connected iff at least one obligation in G1 can be aggregated with one obligation in G2 (i.e. they refer to the same holding/position).

Group component, i.e. given a graph of groups, the component is simply a connected component in the graph. Hence, if two groups G1 and G2 are in different components, they have no obligations that can be aggregated.

Holding, i.e. a holding AI is defined by the volume of the instrument/currency I held in account/cash record A.

Clearing And Settlement Process

Figure 2:
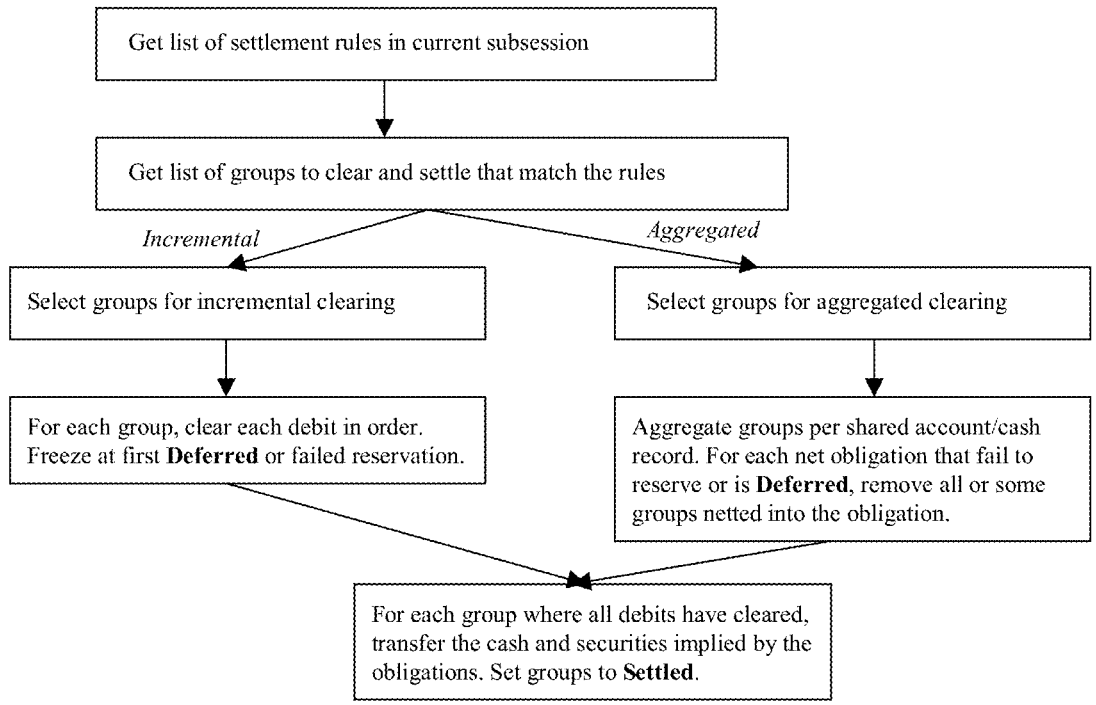
FIG. 2 illustrates an example of an overall clearing and settlement process.

The overall clearing and settlement process is shown in FIG. 2 and can be described as follows.

1. First two lists of settlement rules of purpose LockinIncremental and LockinAggregated are retrieved. This determines the selection criteria of which groups should be cleared in the current subsession. The criteria consists of a list of sources, instrument classes, currencies and types (message/operation).
2. From the selection criteria, choose a subset of all unsettled groups (or all, depending on the number of inserted trades).
3. For those groups to be cleared incrementally, the clearing proceeds by clearing the groups, one by one, and within a group, clearing the obligations one by one. Whenever an obligation is Deferred, or overdraws an account/cash record, the clearing of the group is frozen (to be reconsidered in later invocations of the system). When all debit obligations of a group are cleared, the group is marked as fully cleared.
4. For those groups to be cleared in aggregation, the clearing proceeds by aggregating the groups (see below) into net obligations. For each net obligation, neither Deferred nor overdrawing, each group aggregated into it is marked as fully cleared.
5. For each fully cleared group, the system proceeds by adjusting each account and cash record against the obligations in the group. Such groups are then Settled.

Incremental clearing is performed as follows.

A. Let (G1, . . . , Gn) be a list of groups.
B. For each group Gi in the list, let (o1, . . . , ok) be its list of obligations.
  1. For each obligation oi=(A,I,V,P) in the list, where the available volume of AI is Av:
  2. if P=Deferred and V<0, return.
  3. if P< >Deferred and V<0, check if Av+V>=0. If not, return. Otherwise, make the reservation of V in AI, and continue in 1.
  4. Continue in 1.

Hence, incremental clearing considers one group at a time, obligation by obligation, and reserves each debit in order. If, not all debits are successfully locked in, because of a Deferred obligation, or an overdraft, the group is left partially cleared. It remains this way, until either the deferral is removed or the affected account/cash record has more available volume.

Aggregated clearing is performed as follows.

1. Let G=(G1, . . . ,Gn) be a list of groups, where no group contains a Deferred obligation (these are filtered out).
2. For each group Gi in the list, let Oi=(o1, . . . , ok) be its list of obligations.
3. Let O be the aggregated union of all Oi.
4. For each obligation oi=(A,I,V,_) in O, where the available volume of AI is Av:
5. if V<0, check if Av+V>=0. If so, continue in 4. Otherwise, remove m groups H1, . . . , Hm (let m be the smallest such number) from G, where Hi contains an obligation (A,I,Wi,_), Wi<0, such that Av+V−(W1+ . . . +Wm)>=0, and continue in 3.
6. Continue at 4, selecting the next obligation.

Hence, aggregated clearing considers all groups simultaneously, and aggregates all the contained obligations.

The result is a list of netted obligations that all must be cleared together. If this fails, because of one debit making an overdraft against an account (cash record), a number of groups that debit the account are removed to make the clearing successful.

Once some groups have been removed, the aggregation is re-computed, and the clearing repeated. Eventually, all netted obligations can be cleared, and the groups that still remain in the aggregation are cleared and settled together.

For example, consider the following scenario, consisting of 4 groups, and 9 obligations. Assume A2 has no holding, and that A3 has a holding (of the selected instrument) of 40.

| Group | A1 obligations | A2 obligations | A3 obligations |
|---|---|---|---|
| G1 | +30 | | −30 |
| G2 | | −10 | +10 |
| G3 | +20 | −20 | |
| G4 | | +20 | −20 |
| Total | +50 | −10 | −40 |

First, note that using incremental clearing, either G1 or G4 can be cleared, but not both. Also, neither G2 nor G3 can be cleared incrementally (since A2 is empty).

Now, using aggregated clearing, three obligations result: +50 against A1, −10 against A2, and −40 against A3.

Since A2 is empty, these three obligations cannot clear simultaneously.

Using the principle in step 5 above, either G2 or G3 is removed, since this suffices to make the clearing of A2 succeed.

Let us assume G2 is removed. The aggregation then results in:

| Group | A1 obligations | A2 obligations | A3 obligations |
|---|---|---|---|
| G1 | +30 | | −30 |
| G3 | +20 | −20 | |
| G4 | | +20 | −20 |
| Total | +50 | ±0 | −50 |

That is, two obligations result: +50 against A1, and −50 against A3.

Since A3 holds an available volume of 40, these two obligations cannot clear simultaneously.

Using the principle in step 5 above, either G1 or G4 is removed, since this suffices to make the clearing of A3 succeed.

Let us assume G1 is removed. The aggregation then results in:

| Group | A1 obligations | A2 obligations | A3 obligations |
|---|---|---|---|
| G3 | +20 | −20 | |
| G4 | | +20 | −20 |
| Total | +20 | ±0 | −20 |

These net obligations (+20, −20) can be cleared, and the aggregated clearing thus completes.

However, note that if we in the original list of groups were to remove G3 instead of G2, the result is:

| Group | A1 obligations | A2 obligations | A3 obligations |
|---|---|---|---|
| G1 | +30 | | −30 |
| G2 | | −10 | +10 |
| G4 | | +20 | −20 |
| Total | +30 | +10 | −40 |

This time, the net obligations (+30, +10, −40) can be cleared without further removal of groups. That is, the choice of which groups to remove affects the convergence of the aggregated clearing.

Thus, aggregated clearing does not remove the minimum number of groups, but rather tries to remove the minimal number in each step.

As a simple possible heuristic of what to remove in the clearing, consider the following version of the removal, which has the advantage of being easy to explain.

if V<0, check if Av+V>=0□ If so, continue in 4. Otherwise, remove all groups H1, . . . , Hm from G, where Hi contains an obligation (A,I,_,_), and continue at 3.

That is, all groups referencing the overdrawn account are removed. This leads to quick convergence, at the expense of removing a larger number of groups.

Consider the example again:

| Group | A1 obligations | A2 obligations | A3 obligations |
|---|---|---|---|
| G1 | +30 | | −30 |
| G2 | | −10 | +10 |
| G3 | +20 | −20 | |
| G4 | | +20 | −20 |
| Total | +50 | −10 | −40 |

The new heuristic would thus remove G2, G3, and G4, giving:

| Group | A1 obligations | A2 obligations | A3 obligations |
|---|---|---|---|
| G1 | +30 | | −30 |
| Total | +30 | ±0 | −30 |

The settlement system could also provide another clearing mechanism that can be invoked pre-business to complete as many pending trades as possible ahead of the market opening (this to cater for previously received trades to be settled during the current business date).

It is important to include as many groups as possible (to complete as many trades as possible) in the clearing, which is why we introduce the notion of batched clearing. This to allow us to use a more advanced clearing algorithm than can normally be invoked during business hours (for performance reasons).

However, we do not intend to produce the optimal result in the batched run, i.e. clearing as many groups as possible, since the clearing problem is an integer programming problem. Such problems lack efficient optimization algorithms for large instances, and instead we seek an approximation algorithm.

First, consider an integer programming problem. The aggregated clearing problem is formalized as follows.
1. Let G=(G1, . . . ,Gn) be a list of groups.
2. For each group Gi in the list, let Oi=(o1, . . . , ok) be its list of obligations.
3. Let xi in (0,1), such that xi=1 iff Gi is cleared by the aggregation (netting).
4. Maximize x1+ . . . +xn (i.e. maximize the number of cleared groups), given the following constraints.
5. For a given account A and instrument I, where the available volume of AI is Av, the clearing constraint is $$Av+v1x1+ \ldots +vnxn >=0,$$

where vi=V if (A,I,V) in Gi, and 0 otherwise. That is, this constraint states that the aggregation of each debit and credit operation of any group in the solution is less or equal to the available volume of the affected account/cash record. There will be one such constraint per account/cash record.

A solution to the above is such that each volume constraint is satisfied, and the number of groups included in the clearing is the maximum.

Consider the sample used above.

| Group | A1 obligations | A2 obligations | A3 obligations |
|---|---|---|---|
| G1 | +30 | | −30 |
| G2 | | −10 | +10 |
| G3 | +20 | −20 | |
| G4 | | +20 | −20 |

The corresponding equations are (assuming A1 holds 100, A2 holds 0, and A3 holds 40), using the formalization:
Maximize x1+x2+x3+x4, where $$30x1+20x1<=100 \quad (A1)$$

$$-10x2-20x3+20x4<=0 \quad (A2)$$

$$-30x1+10x2-20x4<=40 \quad (A3)$$

The optimal solution assigns x1=1, x2=1, x3=0, and x4=1, i.e. G3 is excluded.

In general, there may be more than one answer to the optimization problem.

Given that we may encounter more than 100 000 trades, the number of variables could exceed 100 000, which is very difficult to solve. Therefore, we need to look at large-scale algorithms that can handle the worst-case.
1. Let (AI, . . . ) be a list of all holdings/positions referenced by any group to be settled, sorted in decreasing order by the number of pending debit obligations against the holding.
2. Enumerate over the list, choosing AI each time.
3. From AI, retrieve the list of all groups (G1, . . . , Gn) that contains an obligation (A, I, _, _).
4. For each obligation (B, J, _, _) and retrieved group, retrieve the list of all groups that contain an obligation (B,J, _, _). Eliminate BJ from the holding list accordingly.
5. Repeat 4 until no more groups are retrieved or until a threshold has been reached (configurable). Hence, the strongly connected component that originates with the list in 3 has been computed.
6. From the list of retrieved groups, run aggregated clearing, using the aggregated clearing algorithm above, and settle the cleared groups.
7. Go back to 2, enumerating over the next holding AI.
8. When the enumeration is finished, all groups remaining as unsettled make up the trades that failed to settle.

As an alternative in step 6, use the following algorithm. Let there be k constraints in the following, and p a pre-chosen probability (set to around 0.80).
1. Initially, let all x1, . . . , xn be set to 0.
2. Let the current assignment be the optimal solution.
3. Flip 50% of the variables, chosen randomly among those set to 0, hence, setting them to 1.
4. If all k constraints are true, and fewer than n variables are set to 1, continue in 2.
5. If some constraints are false, 1 say, then with probability p, flip the value of xi, where the new value of xi reduces 1 more than flipping the value of any other xj does, and with probability 1−p, flip the value of some randomly chosen xi.
6. Continue at 4, unless n*log(n) flips have been made.
7. If time allows (configurable), repeat at 1, keeping the current optimum. Otherwise, return the best of the current optimum and the previous optimum.

Figure 3:
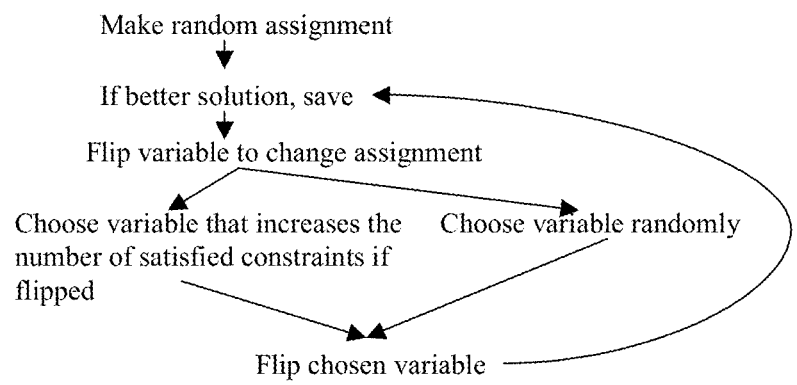
FIG. 3 shows a flow chart exemplifying one possible algorithm for optimizing a group of trades to be cleared.

That is, starting from a random assignment of which groups to include in the aggregation, given a connected component, we search locally for improvements to the current assignment. See the flow outline shown in FIG. 3.

The algorithm iterates making partly random choices to include as many groups as possible in the final solution. It starts from a initial solution, where no groups are included, and randomly includes as many groups as possible until at least one constraint is violated (using a Zeno-like inclusion).

Once a constraint has been violated, the algorithm tries to improve the current assignment by flipping the variable that improves the assignment the most, but occasionally flipping some variables chosen randomly. Hence, this strives to come closer to a solution.

This repeats until too many iterations have been made, or a solution is found. At this point, the solution is saved, and the process is repeated by greedily trying to add yet other groups.

Eventually, the limit of iterations is reached, and if time allows, the whole process starts over, in hope of finding an even better solution.

Figure 4:
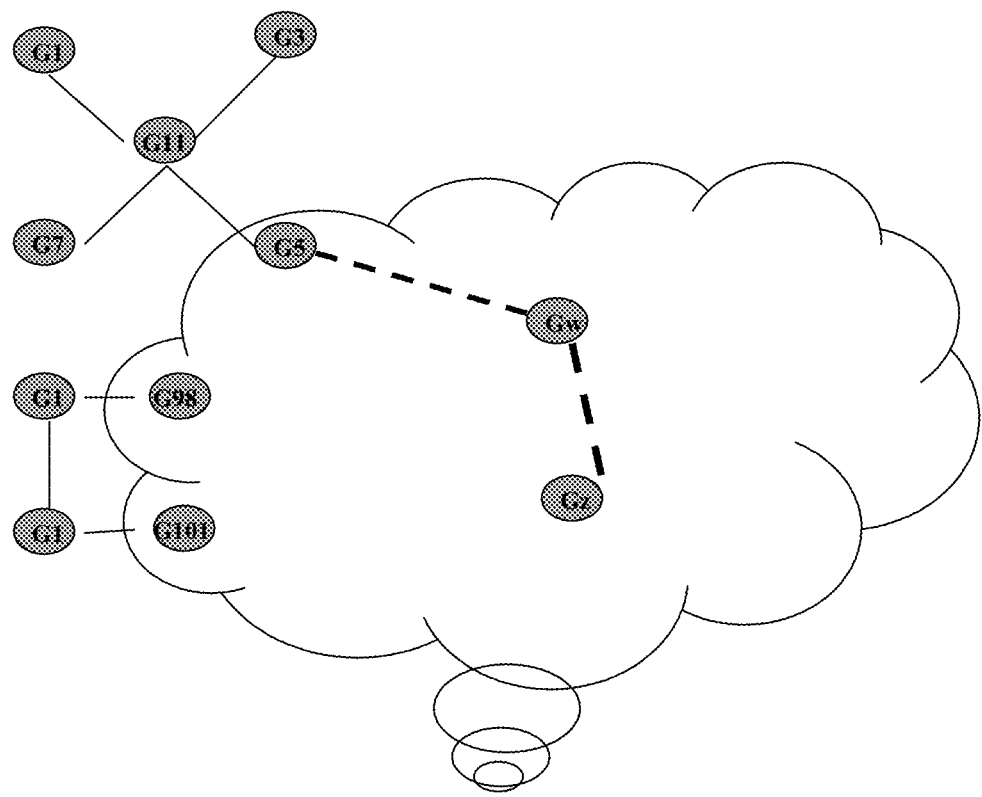
FIG. 4 shows a graph exemplifying one possible selection for optimizing a group of trades to be cleared.

Consider the graph sketch in FIG. 4 for an example.

FIG. 4 is meant to illustrate a graph of groups, where G11 is particularly connected (to G1, G3, G5, G7), and hence possibly a candidate to eliminate if it contains debit operations that collide with those of its neighbors.

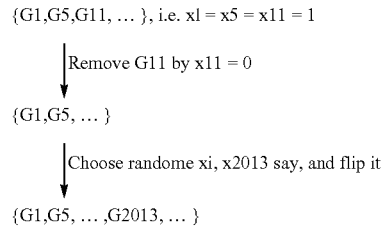

Hence, two steps in the iterative algorithm may thus be: Where at some point, G11 is first included, i.e. x11 is set to 1, and then later its value is flipped, i.e. G11 is excluded by setting x11 to 0.

This algorithm is known to be very effective in quickly finding good solutions.

Another challenge with this algorithm is to make its flip-evaluation efficient, since it will be based on quickly propagating the effects of including/excluding a group from the aggregation. However, this is rather straightforward, since the function is simply based on applying obligations to a set of accounts/cash records (this is what happens when an xi is flipped, i.e the group Gi is evaluated, either by removing its effect when setting xi=0, or adding its effect when setting xi=1).

For example, the flip evaluation can be described as follows.

| New value | A1 | A2 |
|---|---|---|
| x1 = 0 | +10 | −10 |
| x1 = 1 | −10 | +10 |
| ... | | | where G1 is described as follows:

| Group | Obligations |
|---|---|
| G1 | (A1, I, −10), (A2, I, +10) |

That is, whenever x1 is set to 0, 10 is added of I to A1, and 10 is subtracted from A2. On the other hand, when x1 is set to 1, 10 is subtracted from A1, and added to A2.

Thus, the representation of the group component is such that a list of affected accounts and cash records is maintained, and whenever a group is evaluated either for inclusion or exclusion, the corresponding accounts, and any violated volume constraint are quickly identified. This should make the performance of the iterative algorithm sufficient.

The Settlement System

The settlement system can further be described with the following features.

For any generic and flexible piece of functionality there is a need to define the actual behaviour in a certain scenario. This can be achieved in two ways:

by implementing specific adaptations of the generic functionality, or by having a number of parameters defining the actual "flavour" of the generic functionality For a CSD system product to be efficient, both for the system vendor and the operators of the system, the actual solution could be one of the two ways or a mix of both. This part of the description is aimed at the need for a generic functionality to define, control and run the different settlement processes, which a CSD operator may need to support.

In one known settlement system there is the concept of settlement rules. A settlement rule is an object, which defines how the matching, clearing and settlement process of the system will behave for one specific settlement instruction (SI), settlement obligation (SO) or settlement obligation group (SOG). The different settlement rules can be administered to adjust and adhere to market needs and behaviour.

In order for the system to choose the correct rule to apply at a given step in a process, the system must filter out which rule to use. For the applicable, valid, settlement rule of a specific purpose (e.g. matching or lock-in of securities) the combination of the following attributes (the "fingerprint") of the SI/SO/SOG must be unique in order to perform the filtering:

Source (e.g. an external system or an internal system module)

Payment Currency

Transaction type, i.e. the purpose of the transaction based on:

i. Message Type (e.g. DvP, FoP or PvN)

ii. Operation Type (e.g. CSD link, maturity payment or normal trade settlement)

Settlement Method (e.g. RTGS or BIS Model 2)

External Instrument Class (e.g. fixed income securities or equities)

The actual rules (i.e. how the system should behave) are given by the system implementation (as specified by the CSD).

To control what dates and times the different settlement rules are valid, they are listed in the subsessions as valid settlement rules for that sub session.

For the disclosed settlement system it is suggested that a number of matching rules and optimization routines are added as well as the concept of grouping settlement instructions that are due to settle together (but not necessarily simultaneously).

Figure 5:
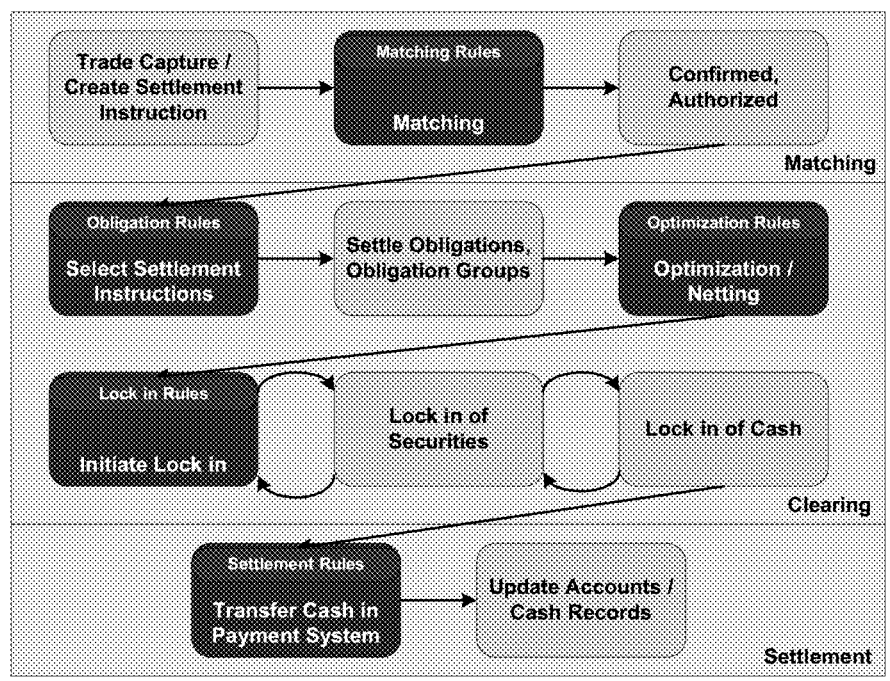
FIG. 5 illustrates the generic clearing and settlement process.

The generic clearing and settlement process in the settlement system, which is not explained in details here, could be summarized as in FIG. 5.

Figure 6:
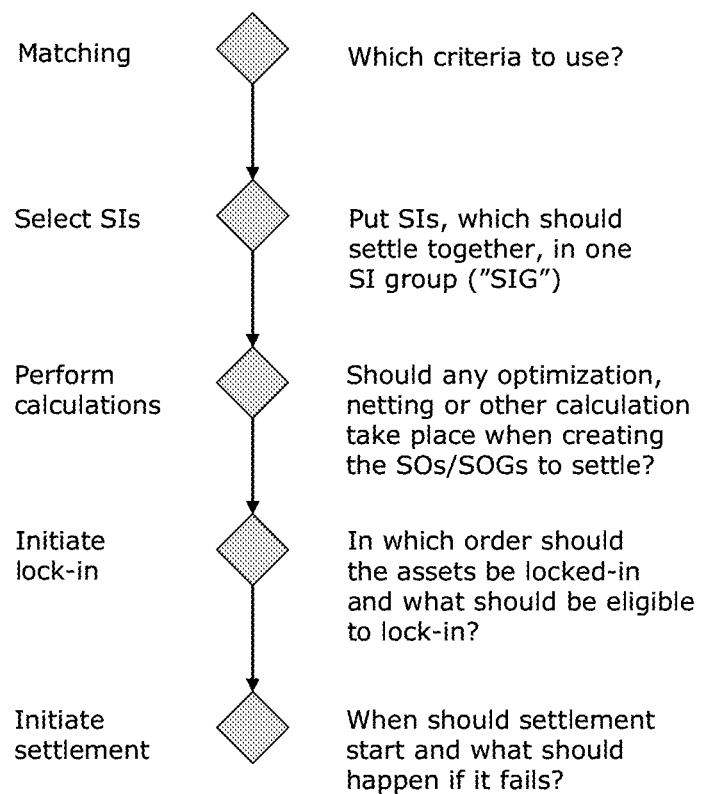
FIG. 6 illustrates the process at waypoints in the generic clearing and settlement process in FIG. 5.

At a number of steps in the process there is a need to make a decision on how to proceed. These "waypoints" are marked in FIG. 5 as "Initiation based on rules". It should be possible to filter out any settlement rule at the waypoints in the process, i.e. if a SI had a fingerprint based on a certain source, transaction type and instrument class it could e.g. filter out a rule for matching based on the source only and then filter out a rule for optimization based on transaction type and instrument class. The process at the waypoints can be described in FIG. 6.

The number of possible combination of fingerprints times the number of waypoints makes the potential mix of rules complex. However the potential flexibility makes the solution very dynamic. In order to reduce the complexity some or all of the steps can be given in the system for certain types of transactions, e.g. for SIs related to corporate actions. That is, on certain conditions the system will select the appropriate rule to use in the different steps without filtering out the rules based on the fingerprint.

Examples of Transaction Flows

Figure 7:
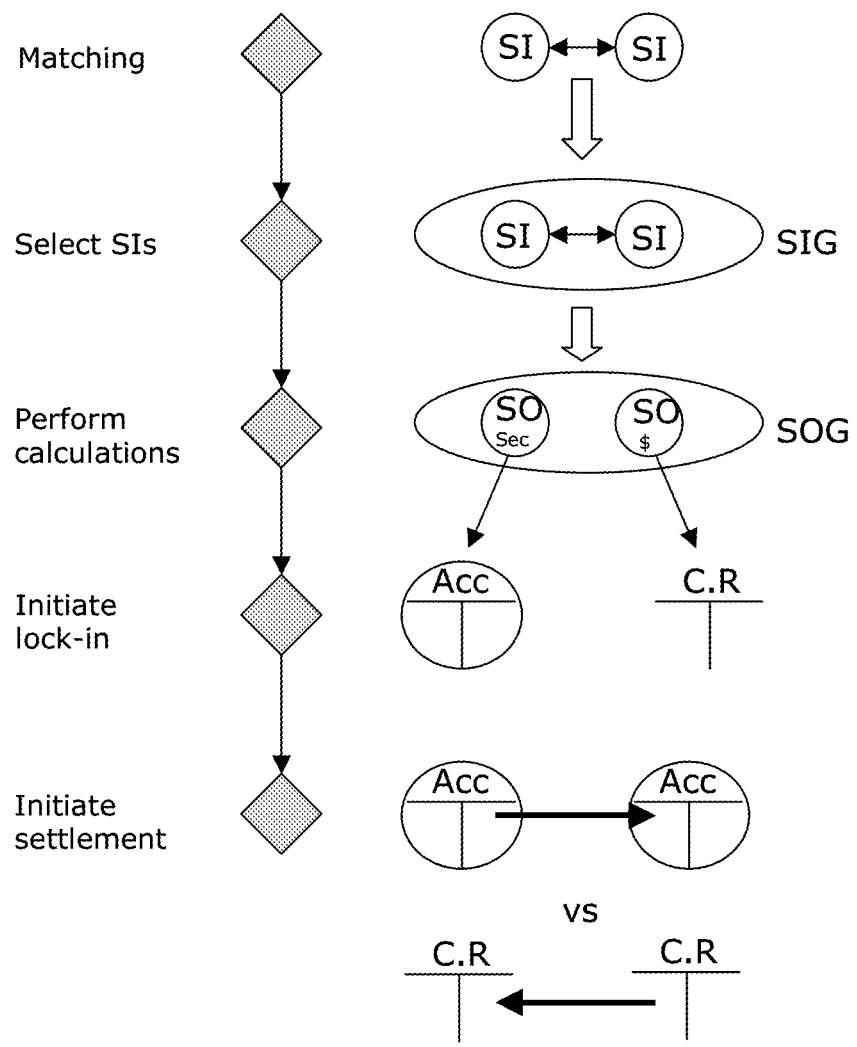
FIG. 7 further exemplifies the process at different waypoints.

In order to visualize the rather complex flow at the different waypoints a number of examples are given in FIG. 7.

Real Time Gross Settlement (RTGS)

An RTGS would consist of two settlement instructions, created based on e.g. a stock exchange trade or an OTC trade. The two SIs would be grouped in one SIG and when selected for SO/SOG creation they would be mapped to one SO each without any kind of intermediate calculation.

The lock-in would be on a gross volume/amount and when time for settlement (typically as soon as possible on S), the accounts and cash records would be debited/credited simultaneously.

Optimized RTGS

The settlement of a group of RTGS transactions is valid as an example of an optimized settlement process: Out of four matched pairs of SIs, three are selected to participate in one SIG aimed for optimization. The selection criteria may be e.g. Source=Stock Exchange. When creating the SOs to lock-in the system would try to optimize to settle e.g. as many transactions as possible with as little liquidity use as possible.

Let us assume that the optimization process resulted in four obligations, two to lock-in securities and two to lock-in cash, calculated as the netted obligations per instrument/currency and account/cash record. These four SOs volumes/amounts would be enough to cover all the six SIs included in the SIG.

Figure 8:
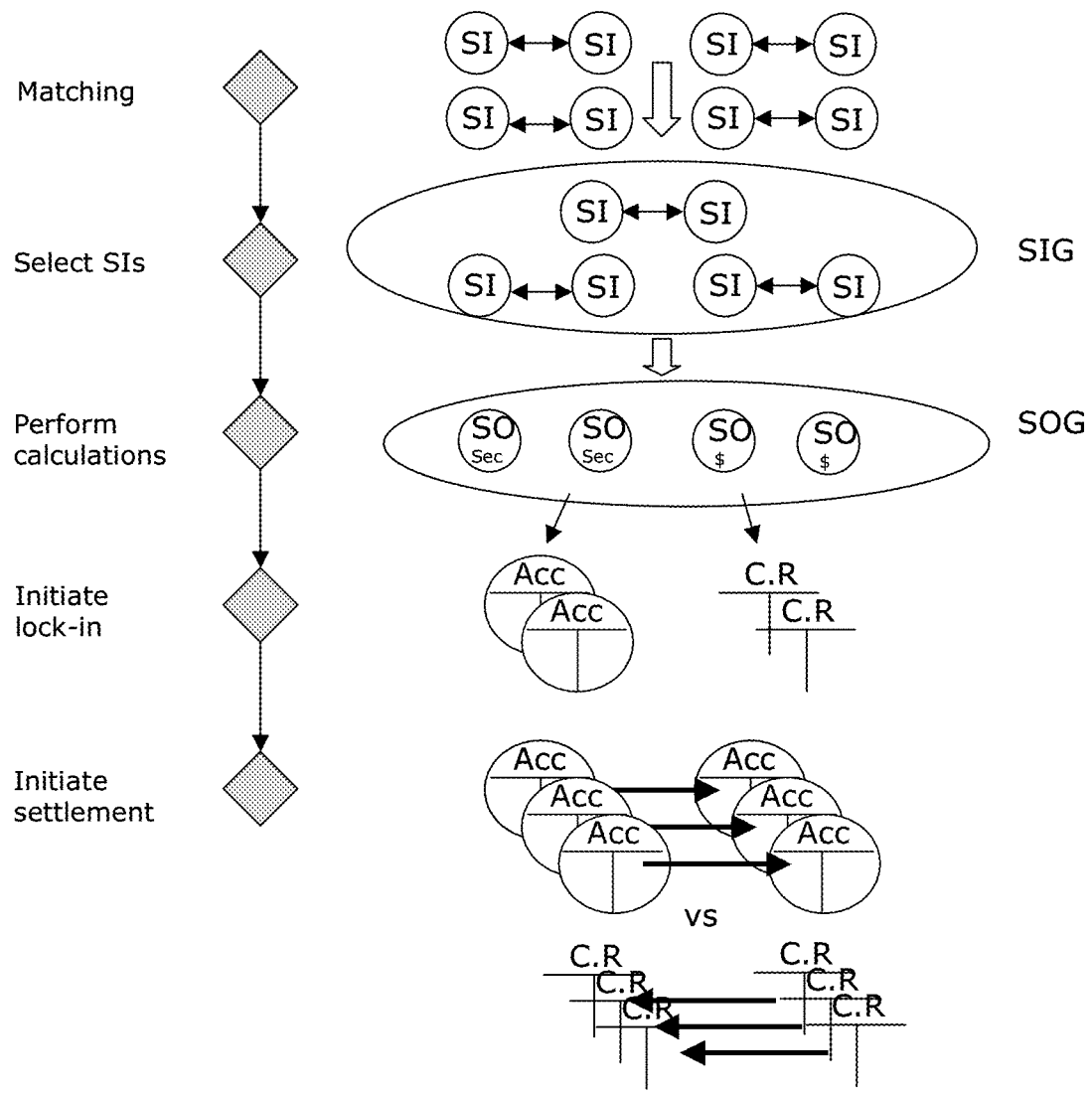
FIG. 8 exemplifies an optimised process at waypoints.

When time for settlement the locked-in assets of the four SOs would be transferred (as one SOG) and the six SIs would be considered settled (gross) delivery versus payment (DvP) at the same time, as shown in FIG. 8.

Netting According to BIS Model 2

In a BIS (Bank of International Settlement) Model 2 netting scenario the securities would be settled gross and the cash would be settled net, by means of novated netted cash obligations.

Out of four matched pairs of SIs, all four are selected to participate in one SIG aimed for the netting. The selection criteria may be e.g. External Instrument Class=FIS (fixed income securities). When creating the SOs to lock-in the system would net the cash obligations of each involved cash record.

Let us assume that the netting process resulted in two net cash obligation and four to lock-in securities. These six SOs volumes/amounts would cover the eight SIs included in the SIG.

Figure 9:
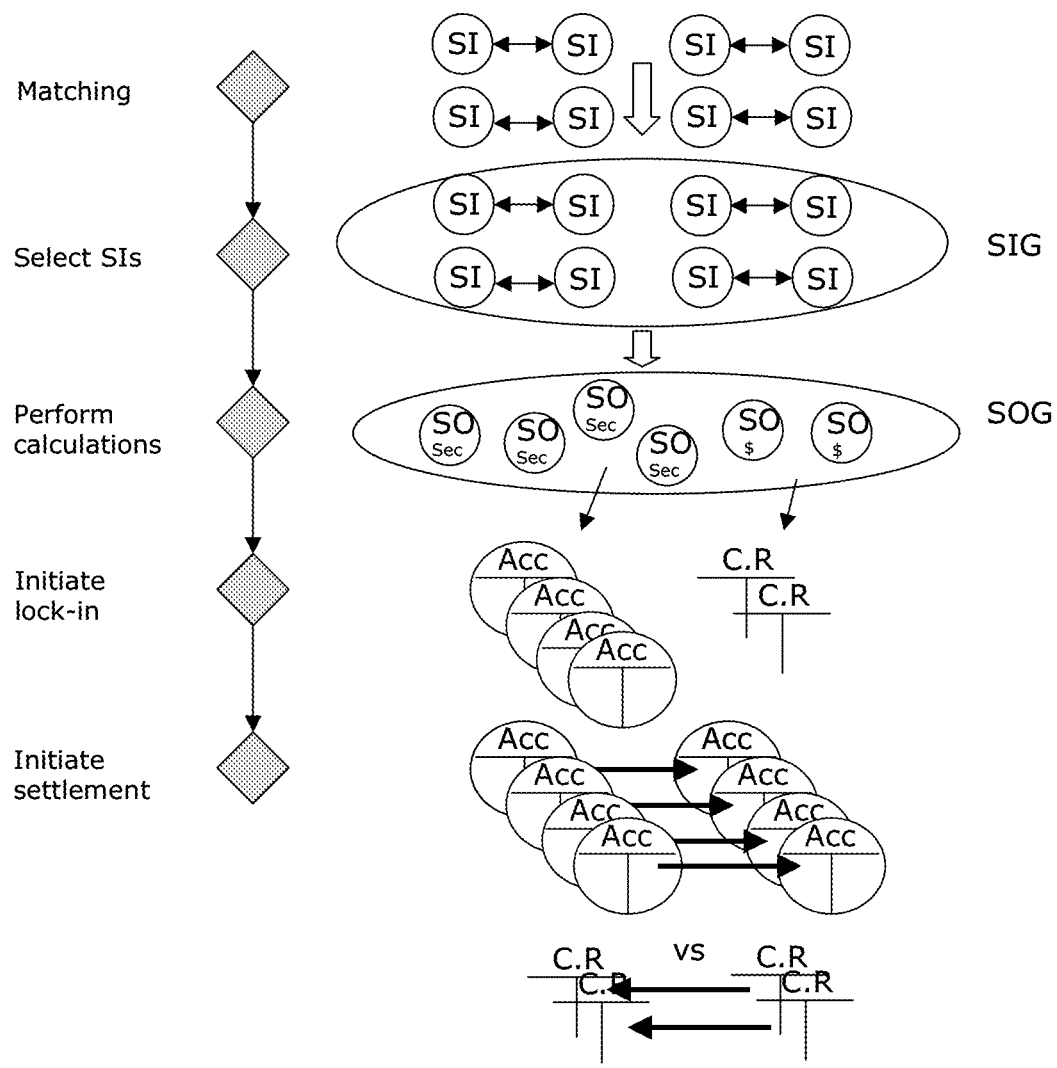
FIG. 9 exemplifies an alternative optimized process at waypoints.

When time for settlement the locked-in assets of the six SOs would be transferred (as one SOG) and the eight SIs would be considered settled (net) DvP at the same time, as shown in FIG. 9.

Figure 10:
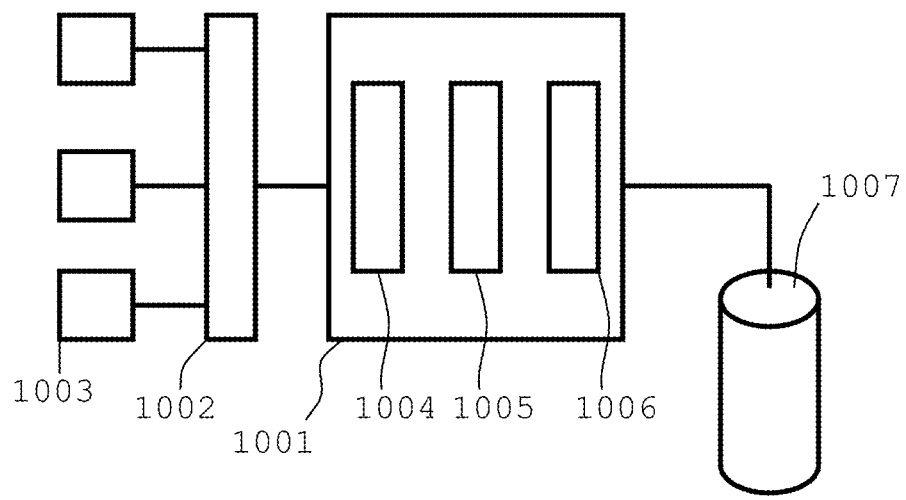
FIG. 10 shows an example embodiment of a securities settlement system.

An example embodiment of a securities settlement system 1001 capable of performing the clearing and settlement methods and procedures disclosed above is shown in FIG. 10.

The securities settlement system (SSS) 1001 can communicate with a trading system 1002 in which matching of deals or trades take place. These trades originate from orders made by users 1003, using trading stations or similar tools for sending in orders to buy/sell to the trading system 1002.

Within the SSS 1001 there is an input 1004 which, apart from receiving orders from the trading system 1002, may sort, modify and store the received information in an appropriate way to facilitate further processing.

In a selector 1005 at least some of the received trades will be selected and grouped together. Selection may be made on a number of parameters, such as user (trade parties) and security type.

The selected group is forwarded to an aggregation unit 1006 for determination of an aggregated obligation required to be met in order to clear (or settle) all the trades. The possible processes for doing so have already been explained above so no further description of this is necessary at this point.

The actual accounts held by the users of the system may be positioned outside of the SSS 1001, as shown by data account memory 1007.

Figure 11:
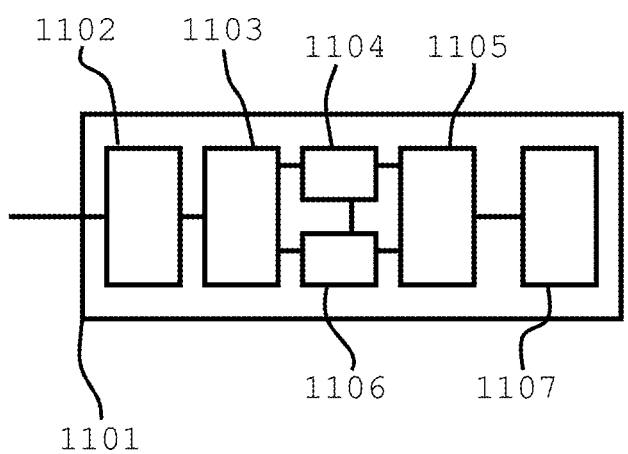
FIG. 11 shows an alternative example embodiment of a securities settlement system.

In FIG. 11 an alternative example embodiment of a securities settlement system 1101.

The securities settlement system 1101 comprises an input 1102 for receiving trade information. Received trade information is then sorted in a sorter 1103 in accordance with a set of sorting criteria. It may thus select all trades involving a certain user or group of users, all trades related to a specific instrument type or instrument types, all trades related to a specific market or markets or a combination of two or more of these. Other selectable criteria can also be made.

Once a selection has been made, the selected group of trades proceeds to an aggregation unit 1104 for aggregation of obligations for each user (or account). Following that all aggregated obligations are compared with each user's (account's) obligation limit to find out if all trades can be cleared at simultaneously.

Should any obligation not be met, one or more trades must be removed, which is done in the selector unit 1106 inaccordance with what has been discussed above. Removed trades are sent back to the selector 1103 and the other trades are once again sent to the aggregator unit 1104 for aggregation of obligations. Once a complete group can be cleared, it is sent to a finalizing unit 1107 for settlement.

The above embodiments are only examples. The invention is defined in the accompanying claims.

The invention claimed is:

1. A first computer system to process executed data transactions, each executed data transaction having a requirement and a computer processing task to fulfill the requirement, the first computer system comprising:
   a communications interface of the first computer system to receive signals including information corresponding to data transactions executed by a second computer system, where each data transaction executed by the second computer system includes an identifier and multiple data transaction parameters related to the data transaction executed by the second computer system that specify the requirement;
   data processing circuitry of the first computer system to generate a list of groups of requirements for executed data transactions, each group having requirements;
   memory, coupled to the data processing circuitry of the first computer system, to store the list of groups;
   wherein the data processing circuitry of the first computer system is configured to:
      determine a constraint for each identifier for each group in the list of groups;
      assign plural groups to a subset of the list of groups for a current computer processing iteration;
      perform the following iteratively:
         (a) for the current computer processing iteration, determine whether an aggregation of the requirements for the subset of the list of groups satisfies the constraint for each identifier, and
         (b) at least partly randomly modify which groups are included in the subset of the list of groups to generate a modified subset of the list of groups for the current computer processing iteration;
      repeat (a) and (b) and identify the aggregation for a largest one of the subsets of the list of groups determined to satisfy the constraint for each identifier;
      perform one or more computer processes to fulfill the requirements for the largest one of the subsets of the list of groups; and
      when a threshold number of computer processing iterations of (a) and (b) is reached, save in the memory the largest one of the subsets of the lists of groups.

2. The first computer system in claim 1, wherein the data processing circuitry is configured to at least partly randomly assign the plural groups to the subset of the lists of groups.

3. The first computer system in claim 1, wherein the data processing circuitry is configured to at least partly randomly remove one or more groups from the subset of the lists of groups.

4. The first computer system in claim 1, wherein the data processing circuitry is configured to at least partly randomly add one or more groups to the subset of the lists of groups.

5. The first computer system in claim 1, wherein the data processing circuitry is configured to repeat (a) and (b) until the threshold number of computer processing iterations is reached.

6. The first computer system in claim 1, wherein the data processing circuitry is configured to perform (a) and (b) after assigning different groups to the subset of the list of groups.

7. The first computer system in claim 1, wherein the data processing circuitry is configured to:
establish a net parameter for each group in the list of groups, where the net parameter may be assigned a first net value or a second net value, and
assign one of the first net value and the second net value to each group in the list of groups for a current computer processing iteration, where the groups assigned the first net value are included in the subset of the list of groups.

8. The first computer system in claim 7, wherein the data processing circuitry is configured to at least partly randomly modify the first net value or the second net value assigned to each group in the list of groups to generate a modified subset of the list of groups for the current computer processing iteration.

9. A method of processing executed data transactions by a first computer system, each executed data transaction having a requirement and a computer processing task to fulfill the requirement, the method comprising the steps of:
(a) receiving, at a communications interface in the first computer system, signals including information corresponding to data transactions executed by a second computer system, where each data transaction executed by the second computer system includes an identifier and multiple data transaction parameters related to the data transaction executed by the second computer system that specify the requirement;
(b) generating, by the first computer system, a list of groups of requirements for executed data transactions, each group having requirements, and storing the list of groups in memory;
(c) determining, by the first computer system, a constraint for each identifier for each group in the list of groups;
(d) assigning, by the first computer system, plural groups to a subset of the list of groups for a current computer processing iteration;
(e) for the current computer processing iteration, determining, by the first computer system, whether an aggregation of the requirements for the subset of the list of groups satisfies the constraint for each identifier;
(f) at least partly randomly modifying, by the first computer system, which groups are included in the subset of the list of groups to generate a modified subset of the list of groups for the current computer processing iteration;
(g) the first computer system repeating steps (e) and (f), identifying the aggregation for a largest one of the subsets of the list of groups determined to satisfy the constraint for each identifier, and saving in the memory the largest one of the subsets of the lists of groups when a threshold number of computer processing iterations of (e) and (f) is reached; and
(h) performing, by the first computer system, one or more data processing tasks to fulfill the requirements for the largest one of the subsets of the list of groups.

10. The method in claim 9, where in step (d), the plural groups are at least partly randomly assigned, by the first computer system, to the subset of the lists of groups.

11. The method in claim 9, wherein the at least partly randomly modifying step (f) includes removing, by the first computer system, one or more groups from the subset of the lists of groups.

12. The method in claim 9, wherein the at least partly randomly modifying step (f) includes adding, by the first computer system, one or more groups to the subset of the lists of groups.

13. The method in claim 9, further comprising:
performing, by the first computer system, steps (e)-(h) after assigning different groups to the subset of the list of groups.

14. The method in claim 9, further comprising:
establishing, by the first computer system, a net parameter for each group in the list of groups, where the net parameter may be assigned a first net value or a second net value, and
assigning, by the first computer system, one of the first net value and the second net value to each group in the list of groups for a current computer processing iteration, where the groups assigned the first net value are included in the subset of the list of groups.

15. The method in claim 14, further comprising:
at least partly randomly modifying, by the first computer system, the first net value or the second net value assigned to each group in the list of groups to generate a modified subset of the list of groups for the current computer processing iteration.

16. At least one non-transitory, computer-readable medium encoded with instructions that, when executed by a processor of a first computer system, perform a method of processing executed data transactions, each executed data transaction having a requirement and a computer processing task to fulfill the requirement, the method comprising the steps of:
(a) receiving, at a communications interface in the first computer system, signals including information corresponding to data transactions executed by a second computer system, where each data transaction executed by the second computer system includes an identifier and multiple data transaction parameters related to the data transaction executed by the second computer system that specify the requirement;
(b) generating, by the first computer system, a list of groups of requirements for executed data transactions, each group having associated requirements, and storing the list of groups in memory;
(c) determining, by the first computer system, a constraint for each identifier for each group in the list of groups;
(d) assigning, by the first computer system, plural groups to a subset of the list of groups for a current computer processing iteration;
(e) for the current computer processing iteration, determining, by the first computer system, whether an aggregation of the requirements for the subset of the list of groups satisfies the constraint for each identifier;
(f) at least partly randomly modifying, by the first computer system, which groups are included in the subset of the list of groups to generate a modified subset of the list of groups for the current computer processing iteration;
(g) the first computer system repeating steps (e) and (f), identifying the aggregation for a largest one of the subsets of the list of groups determined to satisfy the constraint for each identifier, and saving in the memory the largest one of the subsets of the lists of groups when a threshold number of computer processing iterations of (e) and (f) is reached; and (h) performing, by the first computer system, one or more data processing tasks to fulfill the requirements for the largest one of the subsets of the list of groups.

17. The computer-readable medium of claim 16, further encoded with instructions, that when executed by the processor, perform, by the first computer system, at least partly randomly assigning the plural groups to the subset of the lists of groups in step (d).

18. The computer-readable medium of claim 16, further encoded with instructions, that when executed by the processor, perform:

establishing, by the first computer system, a net parameter for each group in the list of groups, where the net parameter may be assigned a first net value or a second net value, and assigning, by the first computer system, one of the first net value and the second net value to each group in the list of groups for a current computer processing iteration, where the groups assigned the first net value are included in the subset of the list of groups.

19. The computer-readable medium of claim 18, further encoded with instructions, that when executed by the processor, perform:

at least partly randomly modifying, by the first computer system, the first net value or the second net value assigned to each group in the list of groups to generate a modified subset of the list of groups for the current computer processing iteration.

* * * * *